(12) United States Patent
Vilarrasa Llorens et al.

(10) Patent No.: US 11,883,774 B2
(45) Date of Patent: Jan. 30, 2024

(54) AIR FILTER FOR REMOVING ALDEHYDE-LIKE VOCS FROM INDOOR AIR

(71) Applicant: Taurus Research and Development, SLU, Oliana (ES)

(72) Inventors: Jaume Vilarrasa Llorens, Barcelona (ES); Lluis Bosch Hereu, Santa Maria de Palautordera (ES); Lluis Trench Roca, Sallent (ES)

(73) Assignee: Air Tech Group, SLU, Sarral (ES)

( * ) Notice: Subject to any disclaimer, the term of this patent is extended or adjusted under 35 U.S.C. 154(b) by 523 days.

(21) Appl. No.: 17/257,711

(22) PCT Filed: Jul. 5, 2019

(86) PCT No.: PCT/EP2019/068116
§ 371 (c)(1),
(2) Date: Jan. 4, 2021

(87) PCT Pub. No.: WO2020/008041
PCT Pub. Date: Jan. 9, 2020

(65) Prior Publication Data
US 2021/0291104 A1    Sep. 23, 2021

(30) Foreign Application Priority Data

Jul. 5, 2018  (EP) .................... 18382499

(51) Int. Cl.
*B01D 53/04* (2006.01)
(52) U.S. Cl.
CPC ...... *B01D 53/0415* (2013.01); *B01D 2251/70* (2013.01); *B01D 2253/202* (2013.01); *B01D 2253/25* (2013.01); *B01D 2255/70* (2013.01); *B01D 2257/406* (2013.01); *B01D 2257/708* (2013.01); *B01D 2257/90* (2013.01); *B01D 2258/06* (2013.01); *B01D 2259/40084* (2013.01); *B01D 2259/4508* (2013.01)

(58) Field of Classification Search
None
See application file for complete search history.

(56) References Cited

U.S. PATENT DOCUMENTS

2013/0052113 A1*  2/2013  Molins ................. B01D 53/04
                                                                 423/210
2016/0228811 A1   8/2016  Meirav et al.

FOREIGN PATENT DOCUMENTS

| CN | 107321328 | 11/2017 |
| JP | H11226100 | 8/1999 |
| WO | WO2017/114687 | 7/2017 |

OTHER PUBLICATIONS

European Patent Office: PCT International Search Report and Written Opinion for PCT/EP2019/068116, dated Oct. 11, 2019, entire document.

* cited by examiner

*Primary Examiner* — Jason M Greene
(74) *Attorney, Agent, or Firm* — Allen, Dyer, Doppelt & Gilchrist, P.A.

(57) ABSTRACT

The present invention discloses an air filter cartridge for use in an air-purifying device for removing formaldehyde (methane, HCHO) and other aldehyde-like VOCs (Volatile Organic Compounds), and in certain embodiments amine-like VOCs, from indoor air. The air filter cartridge is made up of a casing containing a plurality of filament-like elements as a support and a mixture of one or more natural polyphenols and a catalyst integrated in said support as a powder, forming a sponge-like mesh. The air filter acts as an absorption filter, the sponge-like mesh reacting irreversibly with the aldehyde-like VOCs present in the air, generating a polymer in the form of a polyphenol-aldehyde resin inside the air filter. Due to this irreversible reaction, the air filter is capable of capturing formaldehyde, as well as other aldehyde-like VOCs that are less reactive than formaldehyde, amine-like VOCs and ammonia.

15 Claims, No Drawings

AIR FILTER FOR REMOVING ALDEHYDE-LIKE VOCS FROM INDOOR AIR

TECHNICAL FIELD

The present invention relates to an air filter, specifically an air filter cartridge for an air-purifying device, for reducing, substantially eliminating or cleansing contaminating agents from indoor air, suitable for use in residential areas, hospitals, leisure areas and work-space areas. The filter comprises a plurality of filament-like elements, one or more natural polyphenols and a catalytic agent.

The air filter relates specifically to a filter suitable for filtering alde-hyde-like VOCs (Volatile Organic Compounds), wherein the main aldehyde-like VOC to be filtered from indoor air is formaldehyde (HCHO, methanal).

Furthermore, the disclosed air filter may also filter amine-like VOCs and ammonia, as well as imines and aminals as a result of their reaction with aldehydes, from indoor air.

Throughout this document, the acronym "VOC" or "VOCs" may be used instead of the term "Volatile Organic Compounds."

The term "filament-like element" should be understood herein as a slender thread-like object or fibre, also including narrow or thin strips of an elon-gated material, such as tape, acting as a support or carrier for particles.

STATE OF THE ART

In the present state of the art, there exists a wide range of filters available in the market capable of filtering VOCs containing an aldehyde functional group, mainly formaldehyde, such as those disclosed in U.S. Patent No. US 2016/228811, in which the filter comprises a solid amine filtering medium made up of a liquid amine and one or more granular solid support materials (including silica, clay, alumina, carbon, polymer, fibre or combinations thereof) arranged in one or more filter sheets, providing an interaction between the amines present in the filter and the formaldehyde present in the air, flowing through said filter medium.

Patent No. WO 2017/114687 discloses a multi-layer air filter made up of a first layer including a catalyst, a second layer including amines and an op-tional third layer, which is made up of a water absorbing and releasing material, such as a hygroscopic material.

Polyphenols, such as resorcinol, are known to react with aqueous solutions of formaldehyde (known as formol or formalin) by heating under basic conditions, since the beginnings of the polymer chemistry. Phenol-formaldehyde (PF) polymers also known as phenolic resins, in general, and resorcinol-formaldehyde resins in particular (known as resoles), are found in many industrial products and are formed by step-growth polymerization. This known reaction con-veniently and innovatively developed, allows one to trap formaldehyde gas at ppm (parts per million) concentrations.

The present inventions aims to improve and solve certain issues regarding the air filters available in the market by adding one or more polyphenolic substances and a catalytic agent or catalyst, both in a solid state, to a plurality of filament-like elements, which then react with aldehyde-like VOCs, mainly formaldehyde, and amine-like VOCs present in an air-flow going through the filter, to substantially reduce the quantity of aldehyde-like and amine-like VOCs present through absorption, therefore improving the quality of indoor air.

Document US 2013/052113 discloses a method for purifying air and an air purifier used for purifying air, wherein the air purifier comprises a filter with a fibrous structure having a photocatalytic action coating, and a fan or turbine which forces air to pass through the filter, removing VOCs. The air purifier may further comprise a scavenger media, such as phenolic compounds (e.g. resorcinol).

Document CN 107321328 discloses a VOC adsorbent and a process for obtaining such a VOC adsorbent, whose composition includes polyvinyl alco-hol, water, plant polyphenols, kaolin, acidic liquid and a defoamer.

Document JPH11-226100 discloses a filter containing a formaldehyde absorbent, i.e., plant polyphenols, specifically tea-derived polyphenols such as flavan-3-ol and/or flavan-3-ol derivatives.

BRIEF DESCRIPTION OF THE INVENTION

The present invention, as stated previously, aims to improve the air quality of indoor air by reducing, filtering or cleaning aldehyde-like VOCs, and in certain embodiments amine-like VOCs and ammonia, from said indoor air, specifically formaldehyde which is a critical indoor pollutant, as well as certain odours caused by other aldehyde-like VOCs, as well as ammonia and amine-like VOCs.

Formaldehyde is highly reactive as well as toxic, allergenic and car-cinogenic, and when it is present in indoor air at certain levels it poses a significant safety hazard, leading to multiple health problems. Formaldehyde in concentration above 0.1 ppm (parts per million) can cause eye irritation while inhaling said air can also cause headaches, throat irritation and shortness of breath (SOB). Formaldehyde present in indoor air in a concentration equal to or above 5 ppm may lead to death.

Even though formaldehyde and its derivatives pose all these health risks, they are still widely used in a variety of applications such as: i) resins and adhesives, used during flooring and carpeting or in the process of fabricating furni-ture, among others, wherein these industrially pre-pared resins and adhesives, once applied to a building, may gradually release traces of formaldehyde into the indoor air, a process which is accelerated when exposed to heat, e.g. owing to ha heat source (radiator) located nearby or to sunlight, ii) a disinfectant, when present in an aqueous solution used mainly in operating theatres and other rooms in hospitals or cleanrooms, as it kills most bacteria and fungi that may be present, or iii) preservation aqueous solutions, known as formalin or formol, for biological organs in hospitals, museums and biology laboratories.

Therefore, the present invention discloses an air filter cartridge for use in an air-purifying device for removing aldehyde-like VOCs, and in certain embodiments amine-like VOCs, from indoor air. The air filter cartridge is made up of a casing containing a plurality of filament-like elements as a support; integrated in said support there is a mixture of one or more natural polyphenols and a catalyst or catalytic agent, present in the support as a finely divided power, forming a sponge-like mesh.

The air filter acts as an absorption filter, the sponge-like mesh reacting irreversibly with the aldehyde-like VOCs of the indoor air, generating a polymer in the form of a polyphenol-aldehyde resin inside the air filter. Due to this irreversible reaction, the air filter is capable of absorbing very rapidly any trace of formaldehyde present in indoor air, as well as (although not so rapidly) other aldehyde-like VOCs, which are less reactive, volatile and toxic than formaldehyde.

In certain embodiments of the air filter, by increasing the proportion of the sulfonic acid component that is added to the sponge-like mesh, the filter is also capable of absorbing significant amounts of amine-like VOCs and ammonia, as well as of imines and aminals arising from the reaction of amines with aldehydes.

The filament-like elements, uses as the support for the mixture of the finely divided powder of one or more natural polyphenols and the catalyst, are of organic or inorganic nature, selected from amongst a group comprising inorganic fibres, synthetic and semisynthetic fibres, natural fibres and mixtures thereof.

The inorganic fibres are preferably selected from a group comprising glass wool, rock wool, ceramic wool, and mixtures thereof.

On the other hand, synthetic and semisynthetic fibres are preferably selected from a group comprising polyesters, polyamides such as nylons, polypropylenes, their copolymers and mixtures thereof.

Finally, the natural fibres are preferably selected from a group comprising wool, silk, hair, collagen, keratin, cellulose, lignin, and mixtures thereof.

Regarding the one or more natural polyphenols which may be added to the support of the filter, as a finely divided powder, they are preferably selected from a group comprising resveratrol (3,4'5-trihydroxystilbene, a natural product very abundant in the peel of red grapes and in red wine), resorcinol (1,3-benzenediol), pyrogallol (1,2,3-benzenetriol), phloroglucinol (1,3,5-benzenetriol0< and hydroquinone (1,4-benzenddiol) or a combination thereof.

The polyphenols included in the support of the filter, inside the cartridge, are selected for removing aldehyde-like VOCs present in the indoor air, including but not limited to: acetaldehyde or ethanal, glyoxal or ethanedial, propionaldehyde or propanal, acrolein or propenal, propargyl aldehyde or propynal, methylglyoxal or 2-oxopropanal, glyoxylic acid and their alkyl esters, butyraldehyde or butanal, isobutyraldehyde or 2-methypropanal, methylacrolein or 2-methylpropenal, both isomers of crotohaldehyde or 2-butenal, valeraldehyde or pentanal and isovaleraldehyde or 3-methylbutanal, and particularly formaldehyde (HCHO, methanal). Longer-chan aldehydes (i.e., aldehydes of higher molecular weight than those mentioned), such as those used in the cosmetic industry, may also be slowly absorbed, but they have a pleasant odor and their capture is not deemed as necessary.

These aldehyde-like VOCs ma contaminate indoor air as a conse-quence of the reaction olefins, such as unsaturated hydrocarbons from the petro-leum industry and several essential oils and natural perfumes use as air freshen-ers, with ozone coming from the outside or generated internally by laser printers, photocopiers, ionic air purifiers, arc welders or motor brushes. Atmospheric oxida-tion of ethanol vapour (from alcoholic drinks) and other short-chain primary alco-hols (from perfumes) may also produce aldehyde-like VOCs.

In a preferred embodiment the preferred polyphenol is resveratrol, whereas in another preferred embodiment the word "polyphenol" refers to a mixture of resveratrol and resorcinol in a proportion between 10% and 90% of res-ervatrol and between 10% and 90% of resorcinol.

In addition to the powder of one or more polyphenols included in the filter support, made up of a plurality of filament-like elements, the support also includes an acid catalytic agent, preferably a solid sulphonic acid also added as a finely divided powder. The sulphonic acid used in the filter is preferably selected from a group comprising:

- any arenesulphonic acid (Ar—$SO_3H$), such as p-toluenesulphonic acid (TsOH $H_2O$ or TsOH), or benzenesulphonic acid (BsOH),
- any alkanesulphonic acid (R—$SO_3H$), such as 10-camphorsulphonic acid (CSA),
- any sulphonic acid resin, such as strong-acid ion-exchange resins, or sulphonic acid polymers, added as a finely divided powder,
- thymol blue in its acidic form and related triphenylmethane-sulfonic dyes,
- food dyes (such as Allura Red, E129, or Ponceau 4R, E124, and related azo derivatives) in their acidic form, or
- any long-chain alkyl hydrogen sulphate or aryl hydrogen sulphate, RO—$SO_3H$ or ArO—$SO_3H$, respectively, such as common detergents and surfactants in their acidic form.

The present invention further discloses a method of describing how the contaminating agents present in the indoor air react with the air filter disclosed previously, wherein the method for removing aldehyde-like VOCs, and in certain embodiments amine-like VOCs and ammonia, from indoor air is the result of es-tablishing a controlled airflow of the contaminated indoor air to be passed through the air filter so that the aldehyde-like COCs react with powdered naturalpolyphe-nols, preferably resveratrol or mixture of resorcinol and resveratrol, in the presence of the catalytic agent, preferably a solid sulphonic acid, both supported on a plurality of filament-like elements, and through said reaction generating a polymer (a polyphenol-aldehyde resin), which is retained in the filter. In those embodiments where the air filter is also capable of filtering amine-like VOCs and ammonia, as well as imines and aminals due to their reaction with aldehyde-like VOCs, these are captured in the filter due to the presence of the sulphonic acid addes as a powder.

The reactions that take place in the filter, owing to the aldehyde-like VOCs present in the indoor air, will at some point reach a saturation level and will therefore be ineffective, and therefor the method further includes and additional step in which the air filter is removed and exchanged once the saturation level has been reached, as indicated by a visual indicator, in which the sponge-like mesh of the filter undergoes a colour change, in certain embodiments from white to a red-dish-brown colour, depending on the level of saturation at any moment.

In certain embodiments of the air filter, the indicator is the result of the sulphonic acid-catalysed reaction of formaldehyde and related VOCs with the polyphenol or the polyphenol mixture included in the filter.

However, in other embodiments of the filter, the indicator may be the result of the change of colour of thymol blue and related dyes or of food dyes and related azo dyes, all of them used in their sulphonic acid forms, when the reaction of formaldehyde and related VOCs with the polyphenol or the polyphenol mixture used in the filter is completed, i.e. when the sulfonic groups had been neutralized by ammonia, amine-like VOCs and/or derivatives of aldehydes and ammonia or amines.

It will be understood that any range of values given may not be opti-mal in extreme values and may require adaptations of the invention to these extreme values, such adaptations being within reach of a skilled person.

Other features of the invention appear from the following detailed description of an embodiment.

DETAILED DESCRIPTION OF AN EMBODIMENT

To simulate and air filter according to one embodiment of this invention, such as those used in an air-purifying device, which includes a sponge-like mesh made up of a plurality of filament-like elements and a mixture of polyphenols and a solid sulphonic acid used, respectively, in a w/w ration of 2.0:1.0:0.2, a smaller sponge-like mesh with the same proportion is inserted in a sealed test tube and a flow of air containing an increased concentration, measured in ppm, of formaldehyde is passed through said sponge-like mesh within the test tube.

The conditions used to test the effectiveness of the air filter with regards to its ability to absorb HCHO was performed in an air column with a diame-ter of 1.0 cm filled with 120 mg of glass wool, 30 mg of resveratrol, 30 mg of resorcinol (60 mg of polyphenols) and 12 mg of TsOH $H_2O$, with a thickness of 4.0 cm, to simulate the sponge-like mesh of the air filter in a w/w/ratio of 2.0:1.0:0.2.

Contaminated air is passed through the sponge-like mesh inserted in the column at an air flow rate of approximately 2.0 L/min and a speed of 0.42 m/s. The contaminated air that flows through the column has a concentration of formaldehyde of 4.360 ppm.

As shown in the graphs, for these conditions, the amount of HCHO absorbed or captured by the filter (sponge-like mesh) inside the column is at its most effective during the first 100-150 min, wherein the filter absorbs approximately 80% of HCHO present in the flow of air flowing through the filter. However, once this maximum percentage has been reached, the tendency of the slope shown in these graphs with regards to the amount of HCHO absorbed is gradually slower, indicating that the sponge-like mesh inside the column simulating the air filter is becoming saturated and therefore cannot absorb HCHO effectively.

In a preferred embodiment the casing of the air filter cartridge has the following dimensions: a length of 40 cm, a width of 40 cm and a height of 5 cm. However, these dimensions are non-limitative and may vary accordingly, so that the air filter cartridge can be inserted adequately into all kinds of air-purifying de-vices. Modifying the dimensions of the cartridge may vary the w/w ratio of the fila-ment-like elements, the polyphenols, and the sulphonic acid in order for the air filter to function under optimum filtering conditions. In general the different compo-nents that form the sponge-like mesh are used in a 2.0-8.0:1.0-2.0; 0.2-2.0 w/w/ratio, respectively. In a preferred embodiment the fila-ment-like elements, the polyphenols, and the sulphonic acid are used in a 2.0:1.0:0.2 w/w/ratio, respectively.

It has been proved through different tests that the pro-posed air filter can also be highly effective for the elimina-tion of malodours caused by amines of $NH_3$ derivatives (urine smell). To this end it has also been noted that it would be favourable to increase the proportion of sulphonic acid used to the detriment of resorcinol. Thus, considering a typical composition as the one previously referred with the following proportions: 80% resveratrol, 10% resorcinol and 10% of sulphonic acid, the latter could be increased up to 20% when resorcinol being limited to 2% and resveratrol kept to 78%, only as an example, not limitative, providing an it filter highly effective of filtering aldehyde-like VOCs (Volatile Organic Compounds) and ad the same time remov-ing referred malodours.

It has been proved through different tests that the pro-posed air filter can also be highly effective for he elimination of malodours caused by amines or NH3 derivatives (urine smell). To this end it has also been noted that it would be faourable to increase the proportion of sulphonic acid used to the detriment of resveratrol. Thus, considering a typical composition as the one previously referred with following proportions: 80% resorcinol, 10% resveratrol and 10% of sulphonic acid, the latter could be increased up to 30% when resveratrol being limited to 30% and resorcinol kept to 40%, only as an example, not limitative, providing an air filter highly effective for filtering aldehyde-like VOCs (Volatile Organic Compounds) and at the same time removing referred malodours.

It will be understood that various parts of one embodi-ment of the invention can be freely combined with parts described in other embodiments, even being said combina-tion not explicitly described, provided there is no harm in such concentration.

The invention claimed is:

1. A filter cartridge for an air-purifying device for remov-ing aldehyde from indoor air, said filter cartridge comprising a casing containing a plurality of filament-like elements as a support, with at least one natural polyphenol and a catalyst or catalytic agent integrated in said support, wherein said plurality of filament-like elements are of an organic or inorganic nature, and wherein the said filter cartridge is configured to act as an absorption filter and to reacting irreversibly with the aldehyde of the indoor air,
   said at least one natural polyphenol is selected from the group consisting of: resveratrol (3,4',5-trihydroxystil-bene), resorcinol (1,3-benzenediol), pyrogallol (1,2,3-benzenetriol), phloroglucinol (1,3,5-benzenetriol), and hydroquinone (1,4-benzenediol) or combinations thereof,
   said catalyst or catalytic agent comprising a solid sul-phonic acid,
   said support further comprising a mixture of said at least one natural polyphenol and said catalyst or catalyst agent, and
   said mixture provided as a finely divided powder, forming a sponge-like mesh.

2. The filter cartridge according to claim 1, wherein said at least one polyphenol included in the filter cartridge is configured to remove formaldehyde (HCHO, methanal) present in the indoor air.

3. The filter cartridge according to claim 1, wherein said solid sulphonic acid used as the catalytic agent is selected from the group comprising consisting of:
   any arenesulphonic acid (Ar—$SO_3H$),
   any alkanesulphonic acid (R—$SO_3H$),
   any sulphonic acid resin,
   thymol blue in its acidic form and related triphenylmeth-ane-sulfonic dyes,
   food dyes in their acidic form, or
   any long-chain alkyl hydrogen sulphate or aryl hydrogen sulphate, RO—$SO_3H$ or ArO—$SO_3H$, respectively in their acidic form.

4. The filter cartridge according to claim 1, wherein said plurality of filament-supporting elements comprises:
   inorganic fibres selected from the group consisting of glass wool, rock wool, and ceramic wool, or combina-tions thereof,
   synthetic and semisynthetic fibres selected from a group consisting of polyesters, polyamides (nylons), polypro-pylenes, and their copolymers, or combinations thereof,
   natural fibres selected from the group comprising con-sisting of wool, silk, hair, collagen, keratin, cellulose, lignin, or combinations thereof, or
   combinations thereof.

5. The filter cartridge according to claim 1, wherein each one of said plurality of filament-supporting elements, said at least one polyphenol, and said sulphonic acid are provided, respectively, in a 2.0-8.0:1.0-2.0:0.2-2.0 w/w ratio.

6. The filter cartridge according to claim 1, wherein each one of said plurality of filament-supporting elements, said at least one polyphenol, and said sulphonic acid are provided, respectively, in a 2.0:1.0:0.2 w/w ratio.

7. The filter cartridge according to claim 1, wherein said at least one polyphenol is resveratrol.

8. The filter cartridge according to claim 1, wherein said at least one polyphenol comprises a mixture of resveratrol and resorcinol, said mixture comprising between 10% and 90% of resveratrol and between 10% and 90% of resorcinol.

9. The filter cartridge according to claim 1, wherein said casing has the following dimensions:
- a length of 40 cm,
- a width of 40 cm, and
- a height of 5 cm.

10. The filter cartridge according to claim 2, wherein said filter cartridge for removing formaldehyde present in the indoor air is configured to further remove-aldehydes selected from the group consisting of: acetaldehyde or ethanal, glyoxal or ethanedial, propionaldehyde or propanal, acrolein or propenal, propargyl aldehyde or propynal, methylglyoxal or 2-oxopropanal, glyoxylic acid and their alkyl esters, butyraldehyde or butanal, isobutyraldehyde or 2-methylpropanal, methylacrolein or 2-methylpropenal, both isomers of crotonaldehyde or 2-butenal, valeraldehyde or pentanal and isovaleraldehyde or 3-methylbutanal, as well as amine and ammonia.

11. A method for removing aldehyde, amine and ammonia from indoor air, the method comprising:
- passing a controlled airflow of contaminated indoor air through an air filter comprising a plurality of filament-like elements as a support, with at least one natural polyphenol and a catalyst or catalytic agent integrated in the support,
- the plurality of filament-like elements are of an organic or inorganic nature,
- the aldehyde like VOCs configured to react with at least one natural polyphenol in the presence of the catalytic agent, generating a polymer in the form of a polyphenol-aldehyde resin, the air filter configured to retain the polymer in the form of a polyphenol-aldehyde resin, and
- the air filter comprising a sponge like-mesh configured to capture the amine and ammonia, as well as imines and aminals arising from their reaction with aldehyde, due to the catalytic agent present in the air filter,
- the at least one natural polyphenol is selected from the group consisting of: resveratrol (3,4',5-trihydroxystilbene), resorcinol (1,3-benzenediol), pyrogallol (1,2,3-benzene-triol), phloroglucinol (1,3,5-benzenetriol), and hydroquinone (1,4-benzenediol), or combinations thereof,
- the catalyst or catalytic agent is a solid sulphonic acid, and
- a mixture of the at least one natural polyphenol and the catalytic agent is provided in the support comprising the plurality of filament-like elements as a finely divided powder and is configured to form the sponge-like mesh.

12. The method for removing aldehyde, amines and ammonia according to claim 11, wherein the aldehyde are selected from the group consisting of: formaldehyde (HCHO, methanal), acetaldehyde or ethanal, glyoxal or ethanedial, propionaldehyde or propanal, acrolein or propenal, propargyl aldehyde or propynal, methylglyoxal or 2-oxopropanal, glyoxylic acid and their alkyl esters, butyraldehyde or butanal, isobutyraldehyde or 2-methylpropanal, methylacrolein or 2-methylpropenal, both isomers of crotonaldehyde or 2-butenal, valeraldehyde or pentanal and isovaleraldehyde or 3-methylbutanal.

13. The method for removing aldehyde, amine and ammonia according to claim 11, further comprising removing and replacing the air filter once an indicator of the filter has reached a saturation level.

14. The method for removing aldehyde, amine like VOCs and ammonia according to claim 13, wherein the indicator is configured to operate as a result of a sulphonic acid-catalysed reaction of formaldehyde and aldehyde with the polyphenol or the polyphenol mixture included in the air filter.

15. The method for removing aldehyde, amine like VOCs and ammonia according to claim 13, wherein the indicator operates as a result of a change of colour of thymol blue and related dyes or of food dyes and related azo dyes, all of them provided in their sulphonic acid forms, once the reaction of formaldehyde and aldehyde with the polyphenol or the polyphenol mixture used in the filter is completed.

* * * * *